United States Patent
Alloway et al.

(10) Patent No.: US 7,309,256 B2
(45) Date of Patent: Dec. 18, 2007

(54) FLAT FLEXIBLE CABLE ASSEMBLY WITH INTEGRALLY-FORMED SEALING MEMBERS

(75) Inventors: Michael J. Alloway, Canton, MI (US); Wolfgang Ziegler, Karlsbad (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/329,857

(22) Filed: Jan. 11, 2006

(65) Prior Publication Data
US 2007/0161289 A1    Jul. 12, 2007

(51) Int. Cl.
*H01R 13/58* (2006.01)

(52) U.S. Cl. ...................................................... 439/606
(58) Field of Classification Search ................ 439/606, 439/492, 497, 59, 67, 752, 272; 174/135, 174/88 R; 29/829, 33 M, 564.2
See application file for complete search history.

(56) References Cited

U.S. PATENT DOCUMENTS

| | | | | |
|---|---|---|---|---|
| 4,753,005 A | * | 6/1988 | Hasircoglu | 29/829 |
| 4,772,231 A | * | 9/1988 | Hayes | 439/752 |
| 4,776,803 A | * | 10/1988 | Pretchel et al. | 439/59 |
| 4,824,394 A | * | 4/1989 | Roath et al. | 439/395 |
| 6,132,236 A | * | 10/2000 | Kozel et al. | 439/395 |
| 6,612,863 B2 | * | 9/2003 | Terai | 439/492 |
| 6,875,048 B2 | * | 4/2005 | Lee | 439/497 |

* cited by examiner

*Primary Examiner*—Alexander Gilman
(74) *Attorney, Agent, or Firm*—Harold C. Knecht, III

(57) ABSTRACT

A flat flexible cable assembly includes a flat flexible cable having one or more substantially rectangular conductors encompassed within an insulating sheath. An overmold encapsulates and is secured to a portion of the flat flexible cable in an area in which the insulating sheath has been stripped. One or more sealing members are integrally-formed with the overmold and encapsulates and is secured to each stripped conductor to form a seal. The overmold and the sealing member(s) may be made of the same material by using a one-step process. Alternatively, the overmold and sealing member(s) may be made of different material by using a two-shot process. A method of manufacturing the flat flexible cable assembly is disclosed.

11 Claims, 1 Drawing Sheet

FLAT FLEXIBLE CABLE ASSEMBLY WITH INTEGRALLY-FORMED SEALING MEMBERS

TECHNICAL FIELD

The present invention generally relates to a flat flexible cable, and more particularly, to a flat flexible cable including an overmold with integrally-formed sealing members.

BACKGROUND OF THE INVENTION

Flexible flat cables are used to an increasing degree in automobile manufacture as a replacement for ordinary cable harnesses consisting of round conductors. Various advantages are gained during use of the flexible flat cable harnesses in contrast to round cable harnesses. By using rectangular conductors, greater amounts of current can be transferred in comparison with round conductors. Therefore, rectangular conductors may be smaller, without comprising performance. The result is a reduction in weight and space allocation for flexible flat cables.

Moreover, individual cable seals consisting of ribbed cables are commonly utilized as an acceptable method for sealing individual cables in wet areas of the automotive electrical distribution system (EDS). Typically, each cable is isolated and sealed to the round wire insulation by a seal crimp at the electrical interface terminal and then collectively received into an electrical connector. Sealing each individual cable is conventionally done through an automated process.

However, despite the advantages of flexible flat cables, they do not lend themselves to being sealed individually using the automated process referenced above. Currently, in order to individually seal flexible flat cables, each cable must be sealed using an adhesive or a sealant during a secondary process. Such methods may be cumbersome and may add material and labor cost to the manufacturing process.

SUMMARY OF THE INVENTION

The inventors of the invention have recognized these and other problems associated with the flexible flat wire cables. To this end, the inventors have invented a flat flexible cable assembly comprising a flat flexible cable including a substantially rectangular conductor; an overmold encapsulating a portion of the substantially rectangular conductor; and a sealing member integrally-formed with and extending from the overmold, wherein the sealing member encapsulates the substantially rectangular conductor to form a seal.

A method of manufacturing a flat flexible cable assembly comprising a flat flexible cable including a substantially rectangular conductor, the method comprising the steps of:

placing a flat flexible cable assembly within a mold tool; and introducing an overmold material into the mold tool and covering a portion of the flat flexible cable to form an overmold that encapsulates a portion of the flat flexible cable and to form a sealing member integrally-formed with the overmold, wherein the sealing member encapsulates the substantially rectangular conductor to form a seal.

DETAILED DESCRIPTION

In an exemplary embodiment, a flat flexible cable assembly may be used to connect electrical components (not shown) in "wet" areas of an automotive electrical distribution system (not shown). These "wet" areas are known in the industry, and may include, for example, parts of the engine where fluids are present.

Figure 1:
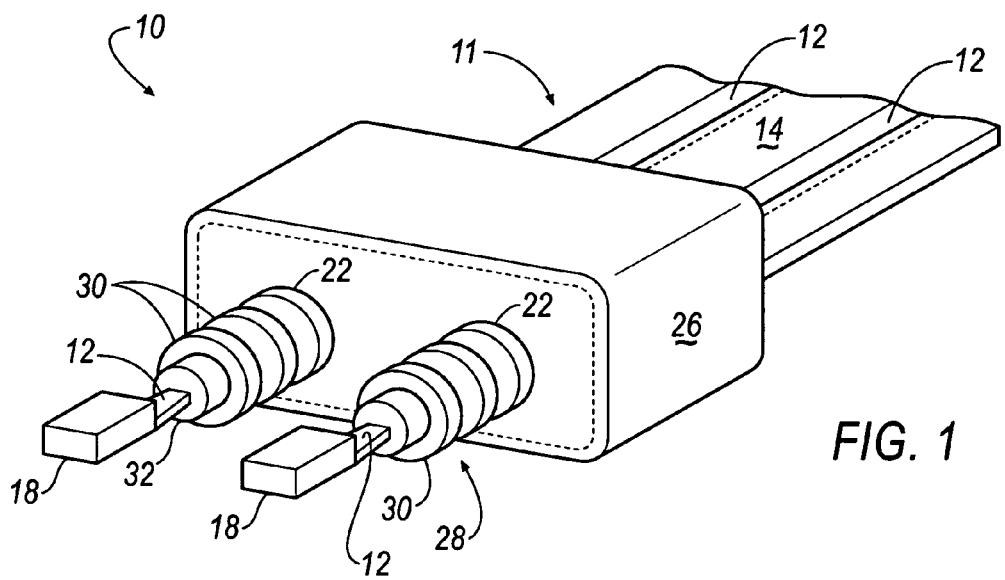
FIG. 1 is a perspective view of a flat flexible cable assembly comprising a flat flexible cable including an overmold with integrally-formed sealing members according to an exemplary embodiment.
Figure 2:
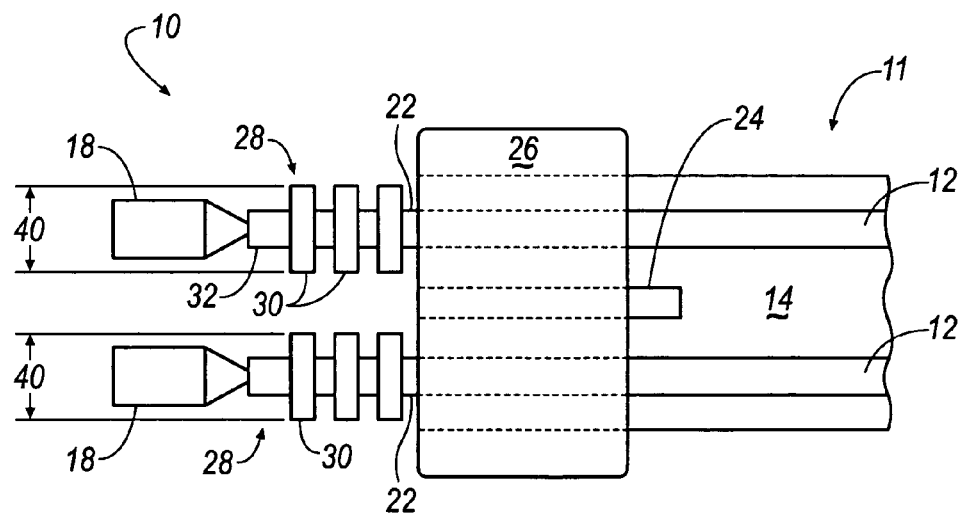
FIG. 2 is a top view of the flat flexible cable assembly of FIG. 1.

Referring now to FIGS. 1 and 2, a flat flexible cable assembly is generally shown at 10 according to an exemplary embodiment. The cable assembly 10 comprises a flat flexible cable 11 including a plurality of conductors 12 encapsulated by an insulating sheath 14. Each conductor 12 may be substantially rectangular in cross-sectional shape. The insulating sheath 14 is made of a material known in the art that is capable of electrically insulating the conductors 12 from one another. According to an exemplary embodiment, the conductors 12 and the sheath 14 may be manufactured by using a co-extrusion process.

The conductors 12 may be made from any conductive material, such as, for example, aluminum, copper, or the like. The insulating sheath 14 is known in the art, and may be manufactured from any number of materials. For example, the sheath 14 may be made of polymeric materials, such as polyvinylchloride (PVC), and the like. Factors to take into consideration when deciding upon the material properties of the insulating sheath 14 include, amongst others, the maximum operating voltage of the rectangular conductors 12 and the temperature of the environment where the flat cable assembly 10 may be located.

A terminal 18 that provides an electrical connection point is formed by stamping and forming in a progressive die. Attachment of the terminal is accomplished by stripping the insulating sheath 14 at one end of each conductor 12 and crimping, or welding the appropriate portion of the terminal to conductor 12. As illustrated in the embodiment, the flat flexible cable assembly 10 includes two conductors 12 and two terminals 18. However, it can be appreciated that the invention is not limited to the number of conductors 12 and terminals 18, and that the invention can be practiced with any desired number of conductors 12 and terminals 18.

Referring to FIG. 2, the insulating sheath 14 includes a means for providing a discontinuity in the insulating sheath 14. For example, the discontinuity may be in the form of one or more barrier slots 24 formed in the insulating sheath 14 proximate to the overmold 26. In another example, the discontinuity may be in the form of slits, and the like. The discontinuity of the insulating sheath 14 provides an interruption or "hazardous path" to prevent moisture from wicking from one terminal to another without causing a complete disruption in the function of the cable assembly 10. As illustrated, the barrier slots 24 are generally rectangular in shape. However, it can be appreciated that barrier slots 24 are not limited to a rectangular shape and may be any desired shape. In addition, it can be appreciated that while only two conductors are shown, there can be a barrier slot between each of additional adjacent multiple conductors and proximate to the overmold 26.

According to an aspect of the invention, the cable assembly 10 includes an overmold 26 that encapsulates a portion of the cable assembly 10 and includes one or more sealing members 28 integrally-formed with the overmold 26 that encapsulates each conductor 12 at the point it attaches to terminal 18 to form a seal for each individual conductor 12. Specifically, the overmold 26 and the one or more integrally-formed sealing members 28 are formed by using an overmold process. During the overmold process, the cable assembly 10 is placed within a mold tool (not shown) and the overmold material is introduced into the mold tool such that the overmold material covers a portion of the conductors 12 at the point it attaches to terminal 18 and also to cover a portion of the insulating sheath 14 proximate the stripped, bare conductors 12. Once the overmold material has been cured, the overmold 26 is positively secured to the insulating sheath 14 while having integrally-formed individual sealing members 28 encapsulating each conductor 12 that has been stripped of the insulating sheath 14. The sealing member 28 may be formed in a well-known manner by including a configuration (not shown) in the mold tool, which may be impressed into the tool, that allows each terminal 18 of the plurality of conductors 12 to be individually sealed by the sealing member 28 during the overmold process.

It can be appreciated that the overmold material used in forming the overmold 26 may be any flexible plastic molding material, such as a thermoplastic elastomer (TPE) material, and the like. Further, it can be appreciated that overmold 26 may also contain insulation properties, similar to electronically insulating sheath 14. As shown in FIG. 2, the overmold 26 does not completely cover the barrier slot(s) 24, thereby allowing the barrier slots 24 to provide a hazardous path preventing migration of moisture between adjacent conductors. The sealing member 28 may be manufactured from the same material as the overmold 26. Alternatively, the sealing member 28 may be manufactured from a different, second material by using a two-shot process.

As described above, the overmold process serves a dual purpose: 1) to form the overmold 26 that is positively secured to the insulating sheath 14 of the flat flexible cable assembly 10, and 2) to form the individual sealing member(s) 28 that extend from the overmold 26 and encapsulate each conductor 12 to form an individual seal around each conductor 12.

As illustrated, the one or more sealing members 28 may comprise one or more ribs 30 that extend circumferentially from a central, tubular member 32. The tubular member 32 encompasses the conductors 12 and extends over a portion of terminals 18. In the illustrated embodiment, the ends of terminals 18 remain exposed. While three ribs 30 are shown, it can be appreciated that the invention can be practiced with any desired number of ribs 30 that are capable of providing an adequate seal for each conductor 12.

Figure 3:
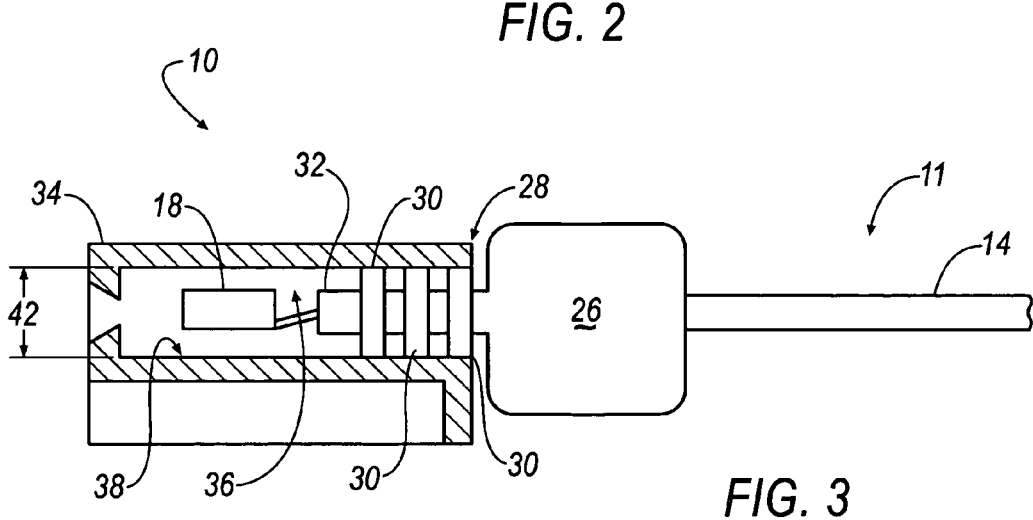
FIG. 3 is a partial cross-sectional side view of the flexible flat cable assembly of FIG. 1 illustrating the flat flexible cable assembly inserted into a sealed connector according to an exemplary embodiment.

Referring now to FIG. 3, the terminals 18 may be inserted into a sealed connector 34 for an automotive electrical component such as, a power outlet, or the like. The terminals 18 of the cable assembly 10 may be inserted into a corresponding number of individual cavities 36 of the sealed connector 34 to engage connection points (not shown) of the sealed connector 34. Once the terminals 18 of the cable assembly 10 have been properly inserted into the sealed connector 34, the ribs 30 of each individual sealing member 28 engage an inner surface 38 of a respective cavity 36. Therefore, the diameter 40 of the ribs 30 for each sealing member 28 is approximately equal to, or may be slightly larger than the diameter 42 of each individual cavity 36 of the sealed connector 34. As a result, the sealing member 28 of cable assembly 10 is positively retained by the sealed connector 34, while sealing each individual cavity 36 from containments, including fluid containments. Thus, the sealing member 28 that is integrally-formed with the overmold 26 seals against access, leakage, or passage of fluids into the sealed connector 34, particularly when the cable assembly 10 is utilized in the "wet" areas of the automobile.

It can be appreciated that the invention can be practiced with the sealing member 28 having any desired shape or size, so long as sealing member 28 engages and seals the individual cavities 36 of the sealed connector 34 and provides an adequate seal. For example, the ribs 30 may be omitted and the sealing member 28 may have a diameter 40 approximately equal to, or may be slightly larger than the diameter 42 of each individual cavity 36 of the sealed connector 34.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A flat flexible cable assembly, comprising:
  a flat flexible cable including at least one substantially rectangular conductor within an insulating sheath, the substantially rectangular conductor having an end;
  a terminal attached to the end of the substantially rectangular conductor and having an electrical connection point;
  an overmold encapsulating a portion of the substantially rectangular conductor encased in the insulating sheath; and
  a flexible sealing member integrally-formed with the overmold, extending from the overmold and encapsulating a portion of the terminal such that the electrical connection point is not encapsulated,
  wherein the sealing member is adapted so as to form a seal when inserted into a cavity of a mating sealed electrical connector.

2. A flat flexible cable assembly as in claim 1, wherein the terminal is attached to end of the rectangular conductor by one of crimping and welding.

3. A flat flexible cable assembly as in claim 1, further comprising a discontinuity in the insulating sheath.

4. A flat flexible cable assembly as in claim 3, wherein the discontinuity comprises a barrier slot formed through the insulating sheath.

5. A flat flexible cable assembly as in claim 1, wherein the sealing member comprises a tubular member and at least one rib extending therefrom, which is adapted to make contact with and seal against an inside surface of a cavity of the mating sealed electrical connector.

6. A flat flexible cable assembly according to claim 1, wherein the sealing member comprises the same material as the overmold.

7. A flat flexible cable assembly as in claim 1, further comprising a sealed connector having an electrical connection point in a cavity defined by an inside surface, wherein the sealing member is adapted so as to form a seal against the cavity, when the terminal is inserted into the cavity and the electrical connection point of the terminal and the electrical connection point of the sealed connector make an electrical connection.

8. A method of manufacturing a flat flexible cable assembly, the method comprising:
providing a flat flexible cable comprising at least one substantially rectangular conductor within an insulating sheath, with the substantially rectangular conductor having an end, and a terminal having an electrical connection point;
encapsulating a portion of the substantially rectangular conductor, encased in the insulating sheath, in an overmold; and
encapsulating a portion of the terminal in a flexible sealing member such that the flexible sealing member is integral with the overmold, and the electrical connection point is not encapsulating,
wherein the sealing member is adapted so as to form a seal when inserted into a cavity of a mating sealed electrical connector.

9. A method according to claim 8, wherein the terminal is attached to end of the rectangular conductor by one of crimping and welding.

10. A method according to claim 8, wherein the sealing member comprises a tubular member and one or more ribs extending therefrom that is adapted to make contact with and seal against an inside surface of a cavity of the mating sealed electrical connector.

11. A method according to claim 8, wherein the sealing member comprises the same material as the overmold.

* * * * *